Aug. 3, 1954

C. F. KRAMER 2,685,324

VEHICULAR SEAT

Filed April 3, 1952

3 Sheets-Sheet 1

C. F. KRAMER
INVENTOR.

BY E. C. McRae
J. R. Faulkner
G. H. Oster

ATTORNEYS

Aug. 3, 1954 C. F. KRAMER 2,685,324
VEHICULAR SEAT
Filed April 3, 1952 3 Sheets-Sheet 3
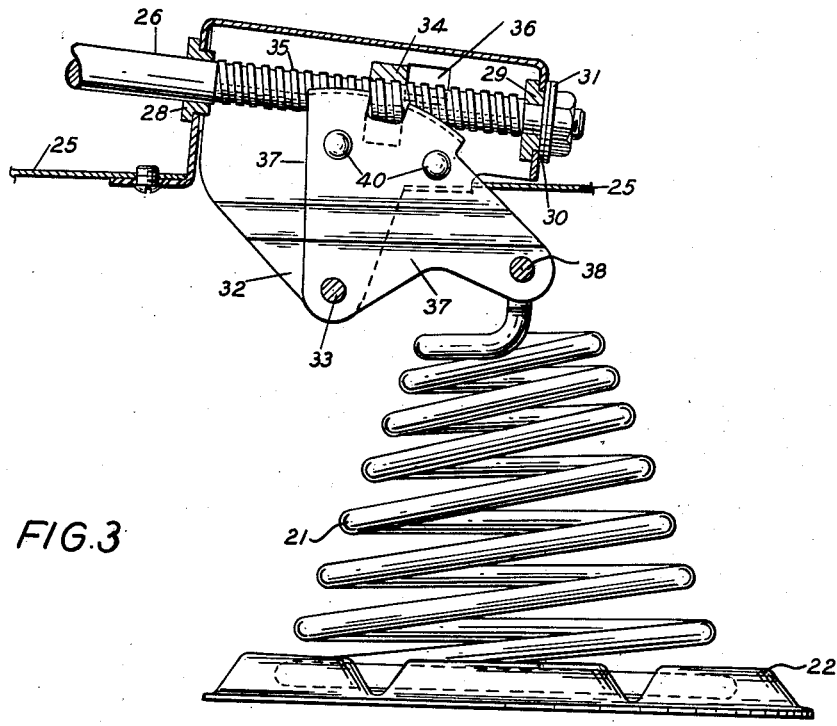
FIG.3
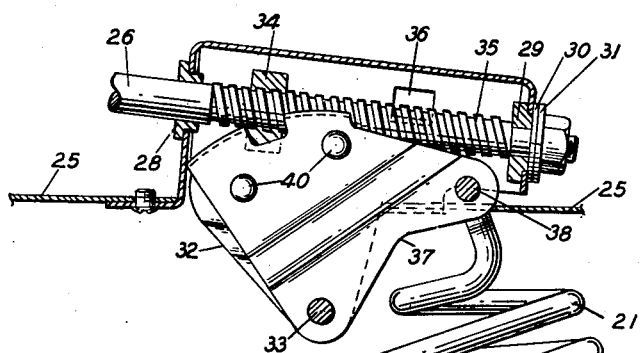
FIG.4
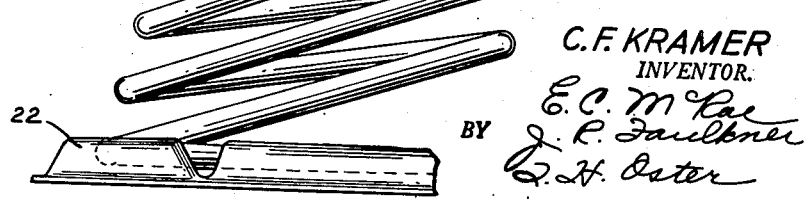
C. F. KRAMER
INVENTOR.
BY
ATTORNEYS

Patented Aug. 3, 1954

2,685,324

UNITED STATES PATENT OFFICE 2,685,324

VEHICULAR SEAT

Clarence F. Kramer, Birmingham, Mich., assignor to Ford Motor Company, Dearborn, Mich., a corporation of Delaware Application April 3, 1952, Serial No. 280,280

2 Claims. (Cl. 155—9)

This invention resides in the transportation field and is more specifically concerned with a vehicular seat for use in the heavy duty type of vehicle which is to a greater or lesser degree inherently rough riding. This application is a continuation-in-part of Application Serial No. 725,521, now abandoned, for "Vehicular Seat" filed January 31, 1947 in the name of Clarence F. Kramer.

The tendency in truck design has been to larger and heavier vehicles. This tendency has introduced difficulties insofar as the riding qualities of the vehicle are concerned. Some degree of driver comfort has, of necessity, been sacrificed in the design of trucks. To alleviate this condition, the industry has provided seats which are not rigidly attached to the body, but are secured thereto through a linkage controlled by a suitable spring and recoil absorber. This invention has been perfected to permit the satisfactory adjustment of such a linkage.

An object of this invention is to provide such a linkage and a control mechanism which is adjustable to accommodate the preferences of individual occupants.

It is a further object of this invention to provide a seat suspension linkage in which the tension of the spring load suspending means is adjustable without affecting any of the other components of the system.

It is a further object of this invention to provide a seat suspension mechanism in which the tension of the supporting spring is adjustable without changing the height of the seat.

Figure 5:
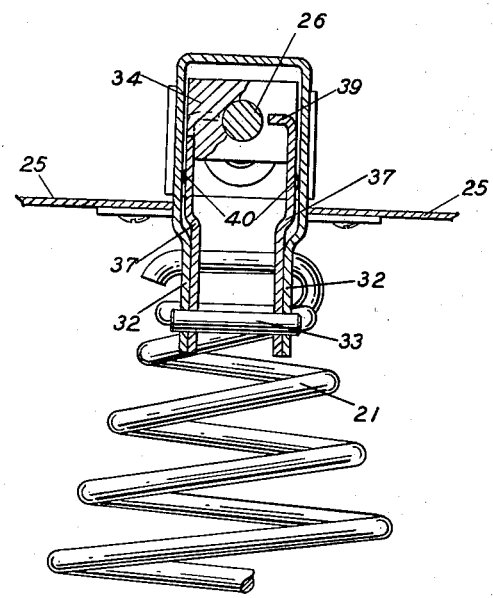
Figure 1:
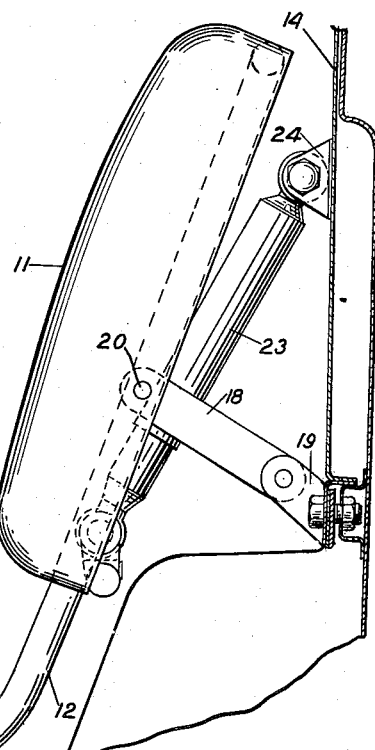
Figure 1:
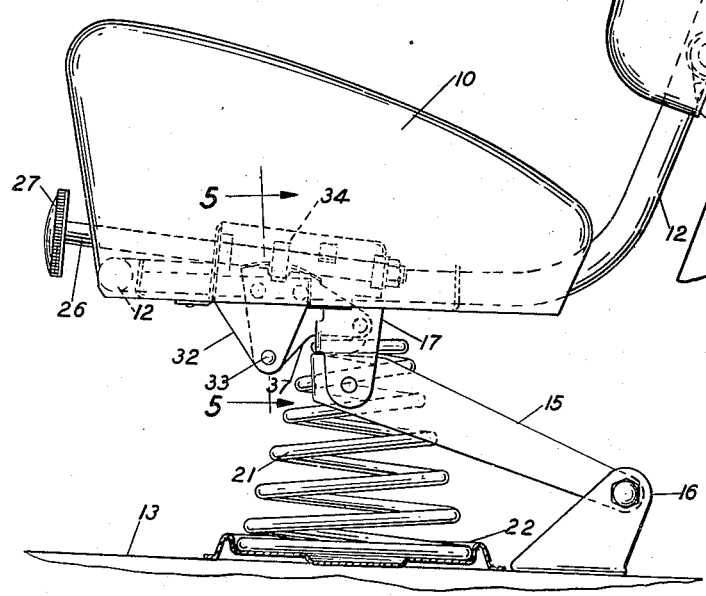
Figure 2:
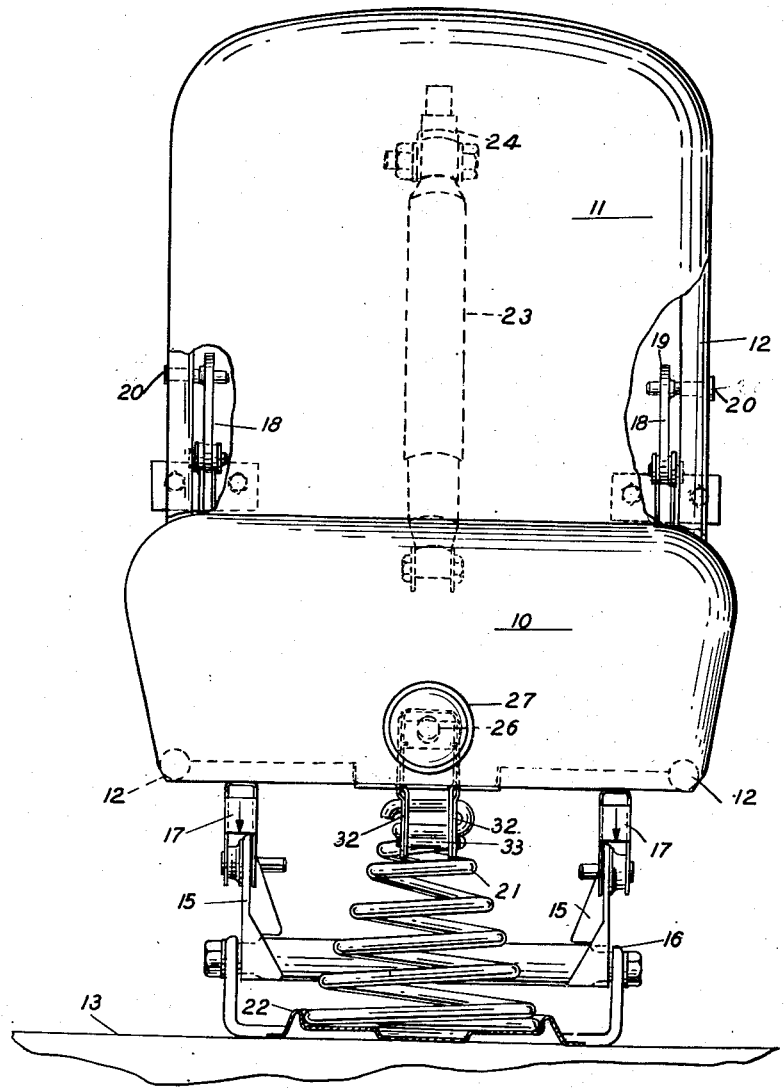

With these and other objects in view, the invention comprises the arrangements, constructions and combinations of the various elements of the structure described in this specification, claimed in the claims and illustrated in the accompanying drawings, in which:

Figure 1 is a side elevation of a vehicle seat and a portion of the cab arranged according to the invention and Figure 2 is a front elevation of this vehicle seat with portions broken away to more clearly illustrate the structure and Figure 3 is an elevation view of a portion of the seat adjusting mechanism showing the spring under maximum tension and Figure 4 is a similar view of the seat adjusting mechanism showing the spring under minimum tension and Figure 5 is a cross section of the spring adjusting mechanism taken on the line 5—5 of Figure 1.

Referring to the drawings, in Figure 1 the seat is generally indicated at 10 and the seat back by the numeral 11. The seat and seatback are supported upon a common tubular frame 12. This tubular frame 12 with attached seat 10 and seat back 11 is supported upon the cab floor 13 and the cab back 14 by a dual quadrilateral linkage. Inasmuch as Figure 1 is a side elevation view, only one half of this dual quadrilateral linkage is seen since the other half lies directly behind the visible half. The lower portion of this dual quadrilateral linkage comprises arm 15, pivotally supported in bracket 16 at one end, and likewise pivotally supported in bracket 17 attached to one side of tubular frame 12. The upper portion of the dual quadrilateral linkage comprises arm 18 pivotally supported in bracket 19 which is bolted to cab back 14. Arm 18 at the extremity remote from bracket 19 is pivotally secured to tubular frame 12 by pin 20.

By reference to Figure 2 of the drawing it will be understood that this type of linkage exists on each side of the seat and permits the seat to oscillate in a vertical direction while restraining it from undesired horizontal motion. The entire seat structure is supported resiliently in a vertical direction by spiral spring 21 which rests in depression 22 in the cab floor 13. The recoil of spring 21 is absorbed by tubular shock absorber 23 which is secured pivotally to the cab back 14 through bracket 24 and likewise is pivotally secured to the seat frame 12. As shown in Figure 2, this shock absorber 23 is mounted intermediate the two portions of the dual quadrilateral linkage. From an inspection of Figures 1 and 2, it is readily apparent that the weight of a driver upon seat 10 will compress spring 21 and cause the entire seat structure and the associated dual quadrilateral linkage to descend relative to the cab. Any road shock tending to impart an upward vertical acceleration to the vehicle will tend to further compress spring 21 due to the inertia of the driver and the seat mechanism. Upon the decay of the vertical acceleration, any rebound of spring 21 will be effectively snubbed by shock absorber 23 and the energy of spring 21 dissipated therein.

The gist of this instant invention resides in the provision of a mechanism for adjusting the tension of spring 21 to accommodate drivers of differing weights and varying tastes in ride characteristics.

The upward movement of the seat mechanism is limited at all times to a constant position by contact of the upper face of arm 15 with the under portion of bracket 17. The plane at which arms 15 and brackets 17 meet to limit the upward movement of the seat mechanism are marked by arrows in Figure 2. To provide for the adjustment of the tension of spring 21 without altering the height of the seat, resort is had to the mechanism more particularly indicated in Figures 3, 4 and 5.

Each of Figures 3 and 4 represents a vertical longitudinal section through the seat adjusting mechanism which is secured to a horizontal steel plate 25 which is in turn secured to tubular frame 12. The shaft 26 of Figures 3 and 4, is a continuation of the shaft 26 shown in Figure 1 and is under control of the driver and operated by hand wheel 27. Shaft 26 is journalled in bushing 28 and bushing 29. Shaft 26 is additionally controlled by thrust washers 30 and 31 to restrain it against axial movement. Bushings 28 and 29 and shaft 26 are received in a box-like welded steel structure which terminates in ears 32 in which is journalled stub shaft 33. This stub shaft 33 is at right angles to shaft 26 and substantially displaced therefrom vertically. In a typical construction the vertical displacement of these two shafts is about three inches. A squared nut 34 is operatively received upon threads 35 which are chased upon the rear end of shaft 26. Inasmuch as shaft 26 is restrained from any axial movement, any rotation of this shaft must of necessity result in an axial movement of squared nut 34 along threads 35 and shaft 26.

The rearward motion of squared nut 34 is limited by ears which are punched from the sides of the welded steel structure which contains the adjusting mechanism. The opening left by the bending in of these ears is indicated at 36 in Figures 3 and 4.

The actual adjustment of the tension of spring 21 is secured by a pair of swinging brackets 37, one of which is located upon each side of the seat adjusting mechanism. These swinging brackets 37 are pivoted upon stub shaft 33 and are provided with openings 38 for the reception of the upper end of spring 21. As can best be seen by reference to Figure 5 of the drawing, the upper edge of swinging brackets 37 are deformed to provide lips 39 which are slotted to receive squared nut 34. Reference to Figure 5 will also show that the spacing of swinging brackets 37 is such that it is impossible for squared nut 34 to revolve when an effort is made to adjust the seat tension.

The action of this seat adjusting mechanism is readily understandable by a comparison of Figures 3 and 4. In Figure 3 the mechanism is shown in the position assumed when the maximum possible tension is desired upon spring 21. In Figure 4 the mechanism is shown in the position assumed when a minimum tension is desired upon spring 31. It will be apparent from a consideration of these two figures that a rotation of shaft 26 in bushings 28 cause a longitudinal or axial movement of squared nut along shaft 26. Since squared nut 34 is received in lips 39 (Figure 5) provided on swinging brackets 37 and further since swinging brackets 37 are pivoted upon stub shaft 33 it is apparent that rotation of the hand wheel 27 will cause a corresponding rotation of swinging brackets 37 about stub shaft 33 and this rotation will in turn displace opening 38 in which the upper end of spring 21 is received upwardly or downwardly as the case may be. A rearward movement of squared nut 34 will, of course, displace opening 38 downwardly and increase the tension on spring 21. Conversely, a forward movement of squared nut 34 will displace opening 38 upwardly and minimize the tension on spring 21. It is apparent in Figure 3 that the rearward movement of squared nut 34 is limited by the ears punched from opening 36 in the mechanism frame. Similarly, adjustment in the opposite direction is limited as shown in Figure 4 by the forward portion of swinging brackets 37 abutting the forward portion of the mechanism frame. Dimples 40 are pressed into swinging brackets 37 to decrease the friction of these brackets against the sides of the mechanism frame.

In the above described mechanism a means has been provided for adjusting the tension in the supporting spring of a vehicular seat without the necessity of simultaneously changing the height of the seat with reference to the other portions of the cab. Thus once an optimum height has been decided upon, it may be fixed for all vehicles and the individual spring tension adjustment obtained as described above.

I claim as my invention:

1. A vehicular seat comprising a seat structure mounted upon a quadrilateral linkage and vertically movable as a unit, stop means which definitely limit the upward movement of the seat structure, a conical spiral spring mounted vertically and extending from the seat structure towards a fixed portion of the vehicle to directly resist vertical motion of the seat, the upper end of said spring being received in a pair of swinging brackets which are pivotally mounted on a stub shaft secured to the seat structure at a point remote from the point of attachment of the upper end of the spring, and means for rotating said pair of swinging brackets about said stub shaft whereby the point of attachment of the upper end of said spring is altered to change the tension of the spring without altering the position of the seat structure, said spring comprising the sole vertical support for the seat.

2. A vehicular seat comprising a seat structure mounted upon a quadrilateral linkage and vertically movable as a unit, stop means which definitely limit the upward movement of the seat structure, a conical spiral spring mounted vertically and extending from the seat structure towards a fixed part of the vehicle to directly resist vertical motion of the seat, the upper end of said spring being received in a pair of swinging brackets which are pivotally mounted on a stub shaft secured to the seat structure at a point remote from the point of attachment of the upper end of the spring, and means for rotating said pair of swinging brackets about said stub shaft whereby the point of attachment of the upper end of said spring is altered to change the tension of the spring without altering the position of the seat structure, said means comprising a threaded shaft, a nut interengaging the threaded shaft and said pair of swinging brackets, and a handwheel for rotating the threaded shaft, said spring comprising the sole vertical support for the seat.

References Cited in the file of this patent

UNITED STATES PATENTS

| Number | Name | Date |
|---|---|---|
| 1,267,792 | Oliver | May 28, 1918 |
| 1,278,730 | Oliver | Sept. 10, 1918 |
| 2,049,550 | Van Dresser et al. | Aug. 4, 1936 |
| 2,193,455 | Hayes | Mar. 12, 1940 |
| 2,366,730 | Hickman | Jan. 9, 1945 |
| 2,652,880 | Gundersen | Sept. 22, 1953 |